United States Patent [19]

Vessey

[11] 3,840,348

[45] Oct. 8, 1974

[54] CRYSTALLIZING ALKALI METAL CONTACT WITH SILICATE DROPLETS IN COUNTERCURRENT AIR FLOW

[75] Inventor: Eric W. Vessey, Springfield, Pa.

[73] Assignee: Philadelphia Quartz Company, Philadelphia, Pa.

[22] Filed: May 10, 1971

[21] Appl. No.: 141,931

[52] U.S. Cl. .............. 23/301 R, 23/302, 23/313, 423/332, 264/117
[51] Int. Cl. .................. B01d 9/02, C01b 33/32
[58] Field of Search ......... 23/313, 300, 301 R, 302, 23/110 A; 264/117

[56] References Cited
UNITED STATES PATENTS

| | | | |
|---|---|---|---|
| 2,860,034 | 11/1958 | Mockrin | 23/313 |
| 2,941,947 | 6/1960 | Schauer | 23/313 |
| 3,340,018 | 9/1967 | Otrhalek | 23/313 |
| 3,471,253 | 10/1969 | Shaver | 23/313 |
| 3,532,473 | 10/1970 | Biegler | 23/313 |
| 3,579,299 | 5/1971 | Sams | 23/110 A |

FOREIGN PATENTS OR APPLICATIONS

| | | | |
|---|---|---|---|
| 1,045,682 | 10/1966 | Great Britain | 23/313 |
| 908,803 | 2/1959 | Great Britain | 23/313 |
| 360,266 | 3/1962 | Switzerland | 23/313 |
| 565,877 | 4/1958 | Belgium | 264/117 |

*Primary Examiner*—Norman Yudkoff
*Assistant Examiner*—S. J. Emery
*Attorney, Agent, or Firm*—Fred Philpitt; Ernest G. Posner

[57] ABSTRACT

Readily soluble crystalline alkali metal silicates with improved physical properties are prepared by forming drops of liquor that will crystallize into the desired species in a prilling tower so that crystallization can take place as the drops fall through the tower. If crystallization is not complete when the particles are exhausted from the tower it can be completed in a fluid bed. More specifically this invention is directed toward the production of sodium metasilicate hydrates and particularly the pentahydrate.

7 Claims, No Drawings

CRYSTALLIZING ALKALI METAL CONTACT WITH SILICATE DROPLETS IN COUNTERCURRENT AIR FLOW

INTRODUCTION

Crystalline alkali metal silicates, especially sodium metasilicate pentahydrate, are usually produced by crystallizing a liquor that has substantially the same composition as the desired crystalline species. These liquors, generally prepared by alkalizing a siliceous silicate solution, are very viscous and are easily supercooled without crystallization. Methods such as seeding and crutching are used to induce crystallization but it still takes place very slowly and in such a manner that careful controls are needed to achieve the desired product. This slow crystallization can be attributed to the fact that a considerable heat of crystallization is generated and the prior art methods do not allow for immediate dissipation of the heat so that the crystallization is slowed down as the temperature rises. Even methods in which the seeded liquor is cast in a thin film or in which the liquor is sprayed onto seed particles large masses of material are involved so that the heat is not easily dissipated. Also the cakes and sheets of crystallized material are difficult to granulate because of the extreme hardness of the material. Therefore, the intense grinding that is necessary to reduce the material to useful particle sizes adds considerable impurities to the product and it may be dusty and cake because of rapid absorption of atmospheric moisture by the fines created. Also the wear parts of the grinding equipment must be replaced often, increasing the cost considerably.

I have discovered a method by which rounded, uniformly sized, well crystallized alkali metal silicates, particularly sodium metasilicate pentahydrate, may be produced in a manner that provides for quick dissipation of the heat of crystallization and therefore an increased crystallization rate. These particles produced have no jagged or protruding edges so that no caking tendency is noted and very few fines are produced. The particles are produced without grinding and extensive screening so that considerable savings on equipment and maintenance are realized. The method involves preparing a liquor that will crystallize to the desired species but at a somewhat lower solids concentration than that of the crystal produced, then adding a limited amount of fine seed crystals and atomizing the mixture into uniform droplets at the top of a prilling tower. As the droplets fall down the tower crystallization that was initiated by the addition of the seed, takes place at a fast rate because the heat of crystallization is dissipated by transfer to the cool, conditioned air flowing up the tower and by evaporating the excess water. In this way the crystallization is quick and complete. If the particle size desired is large and only the surface of the drops are crystallized in passage down the tower, the crystallization can be completed in a fluid bed.

THE INVENTION

The alkali metal silicate liquor with which this invention is carried out can have mole ratios of $M_2O:SiO_2$ of 0.960:1.000 to 2.300:1.000 where M stands for an alkali metal. The solids contents of these liquors would vary with species to be crystallized but the water content of the liquors must be increased slightly so that water can be evaporated to dissipate the heat of crystallization. The excess water should generally amount to 3 to 15 percent of the weight of silicate solids in the crystallized product. Thereby, a liquor used to prepare sodium metasilicate pentahydrate may have a mole ratio of $Na_2O:SiO_2:H_2O$ of 1.00:1.00:5.30. Such liquors are normally prepared by alkalizing a more siliceous alkali metal silicate solution.

The seed particles that are mixed with the liquors are the same species as that being prepared and they should be as fine as possible so that there are a large number of nucleation sites per the weight of seed used. The amount of seed is much reduced from the amount of seed that must be used in the prior art methods. This reduction in seed can be achieved because of the rapid dissipation of heat. In the prior art methods the seed crystals themselves may act as heat sinks because they do not crystallize and are added at ambient temperatures. The amount of seed used in my process can be from 2 to 15 percent based on the weight of liquor but 2 to 5 percent seed particles are preferred to minimize the recycle problem.

The mixture of seed and liquor can be atomized in any way such as a spray nozzle or atomizer wheel as long as the drops formed are uniform and well dispersed so that groups of sticky particles are not formed. The size of the drops can be varied by varying the pressure at the spray nozzle or the speed of the atomizer wheel.

The length or rather height of the prilling tower needed would vary with the particle size desired, but a tower that does not permit complete crystallization of the drop can be used as long as the residence time is sufficient to allow crystallization of the surface of the drops. These drops can be further treated in a fluid bed to complete the crystallization. The residence time of the drops in the tower can be varied by alteration of the velocity of the air being forced up the tower. For particles in the 10 to 100 mesh size range the velocity can be between 25 and 500 ft./minute. The air forced up the tower serves other functions besides regulation of the residence time. The air should be at least about 10° to 40°C cooler than the melting point of the crystals being formed. This difference in temperature allows the heat of crystallization to be dissipated and crystallization to take place rapidly. The air may also be conditioned regarding humidity. If the amount of excess moisture in the liquor is less than what might be evaporated during the fall through the prilling tower, the air must be humidified to balance or prevent overdrying of the particles.

The products of this process are crystallized alkali metal silicates, particularly sodium metasilicate pentahydrate of uniform size, usually between 10 and 65 mesh. The products can have a tamped bulk density of 45 to 65 lbs/cu.ft. The products have a dead white appearance and under the microscope appear to consist of very tiny interlocking crystals. The particles are not sticky and do not cake indicating that the crystallization is complete. The impurity level is very low since no grinding is necessary. These materials are very soluble especially the sodium metasilicate pentahydrate.

These products are useful for any application that presently utilizes soluble alkali metal silicate crystals and they are especially useful in detergent and cleaning compounds.

EXAMPLES

A further understanding of the invention can be obtained from the following illustrative examples which should not be considered restrictive. The prilling tower used was 30 feet in height and the cool air flow that spiraled up the tower was at varying velocities.

EXAMPLE 1

A sodium metasilicate pentahydrate liquor was prepared by adding caustic soda to a sodium silicate solution with a mole ratio of 3.29 $SiO_2/Na_2O$. The mole ratio of the liquor of $Na_2O:SiO_2:H_2O$ was 0.975:1.000:5.273 and the liquor was at 73°C (the melting point is 72°C); as the liquor was pumped to the atomizing device at the top of the prilling tower the liquor had cooled to about 65°C. Then 5 percent of sodium metasilicate pentahydrate particles were added as seed. These seed particles were all —325 mesh size (Tyler). In this case an atomizer wheel was used to disperse the liquor into drops and the wheel was run at 10,000 RPM to form small drops. These seeded drops appeared to have a temperature of between 50° and 60°C after leaving the atomizer wheel. Crystallization started at once and during the residence time the crystallization was complete. The air flowing up the tower was at 55°C and the velocity was 90 feet/minute. The particles were exhausted from the tower at 55°C into a tumbling cooler or a fluid bed in which they were cooled to room temperature. The mole ratio of $Na_2O:SiO_2:H_2O$ of these crystalline prills was 0.975:1.000:4.910. The granules were a dead white product, free flowing and noncaking when subjected to moderate pressure. The granules were found to consist of very tiny interlocking crystals. The particle size of the granules was 48 to 100 mesh indicating a very uniform product and the bulk density was 67 lbs/cu.ft. The dissolving rate was very fast with almost no residual undissolved impurities.

EXAMPLE 2

A preparation similar to example 1 was carried out with the same metasilicate liquor except that the atomizer wheel was run at 8,000 RPM to form somewhat larger drops and velocity of air forced up the prilling tower was 120 ft/min. Again the crystallization was completed during the residence time in the prilling tower. The particles exhausted at 50°C were cooled to room temperature in a fluid bed. The mole ratio $(Na_2O:SiO_2:H_2O)$ of the product was 0.975:1.000:4.952. The granules had a dead white appearance; they were free-flowing and did not cake when subjected to moderate pressure. The particle size of the product was 20 to 100 mesh and the bulk density was 63 lbs/cu.ft. The dissolving rate was very fast with almost no residual undissolved impurities.

EXAMPLE 3

A preparation similar to Examples 1 and 2 was carried out with the same metasilicate liquor except that the atomizer wheel was run at 5,500 RPM to form still larger drops and the velocity of air forced up the prilling tower was 150 ft/min. The crystallization was not completed during the residence time in the prilling tower but the surface of the particles was completely crystallized so that they could be transferred to a fluid bed and the crystallization completed. The mole ratio $(Na_2O:SiO_2:H_2O)$ of the product was 0.975:1.000:4.997. The granules had a dead white appearance; they were free-flowing and did not cake when subjected to moderate pressure. The particle size of the product was 10 to 48 mesh and the bulk density was 58 lbs/cu.ft. The dissolving rate was very fast with almost no undissolved impurities.

EXAMPLE 4

A sodium metasilicate (hexahydrate) liquor was prepared by adding caustic soda to a sodium silicate solution with a mole ratio of 2.47 $SiO_2/Na_2O$. The mole ratio $(Na_2O:SiO_2:H_2O)$ of the liquor was 0.998:1.000:6.158 and the liquor was at 65°C; as the liquor was pumped to the atomizing device at the top of the prilling tower the liquor cooled to about 60°C. Then 7 percent of sodium metasilicate hexahydrate particles were added as seed. These seed particles were all 325 mesh or less. The atomizer wheel was run at 6,000 RPM to form drops. These seeded drops appeared to have a temperature of between 48° and 52°C. Crystallization started at once and was almost complete when the granules were exhausted from the prilling tower. The air forced up the prilling tower was at 50°C and the velocity was 120 ft/min. The crystallization was completed in a fluid bed. The mole ratio $(Na_2O:SiO_2:H_2O)$ of the product was 0.998:1.000:5.971. The granules had a dead white appearance, were free-flowing and did not cake when subjected to moderate pressure. The particle size of the granules was 10 to 65 mesh and the bulk density was 65 lbs/cu.ft. The dissolving rate was very fast with almost no residual undissolved impurities.

EXAMPLE 5

A sodium sesquisilicate pentahydrate was prepared by adding caustic soda to a sodium silicate solution with a mole ratio of 2.47 $SiO_2/Na_2O$. The mole ratio $(Na_2O:SiO_2:H_2O)$ was 2.971:2.000:11.531 and was at 90°C (the melting point is 88°C). As the liquor was pumped to the atomizing device at the top of the prilling tower the liquor had cooled to 83°C. Then 8 percent of sodium sesquisilicate pentahydrate particles were added as seed. These seed particles were all 325 mesh or finer. The atomizer wheel was run at 7000 RPM to disperse the drops. These seeded drops appeared to have a temperature between 75° and 78°C. The air forced up the prilling tower was at 60°C and the velocity was 150 ft/min. The crystallization was complete when the particles were exhausted from the prilling tower to the tumbling cooler. The mole ratio $(Na_2:SiO_2:H_2O)$ of these crystalline prills was 2.971:2.000:10.997. The granules had a dead white appearance, were free-flowing and did not cake under moderate pressure. These granules also consisted of very tiny interlocking crystals. The particle size of the granules was 10 to 65 mesh and the bulk density was 63 lbs/cu.ft. The dissolving rate was very fast with almost no residual undissolved impurities.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. A process for preparing granules of crystallized alkali metal silicate particles selected from the group consisting of sodium metasilicate and sodium sesquisilicate from a sodium silicate liquor having the desired $Na_2O/SiO_2$ mole ratio of the product comprising the steps of:
   a. cooling the liquor to below its melting point,
   b. admixing with said liquor 2 to 15 percent of fine seed particles having the composition of the product,
   c. atomizing the seeded liquor as falling droplets into the top of a prilling tower,
   d. adjusting residence time of the falling droplets in the prilling tower with velocity of countercurrent air flow,
   e. dissipating the heat of crystallization from the atomized liquor droplets with an upward flow of air maintained at 10° to 40°C below the melting point of the crystalline specie,
   f. simultaneously crystallizing the droplets of liquor, and
   g. exhausting the desired crystalline granules from the bottom of the prilling tower.

2. The process of claim 1 in which the alkali metal silicate liquor contains 3 to 15 percent excess water based on the weight of the silicate solids.

3. The process of claim 1 in which the seed particles are finer than 100 mesh.

4. The process of claim 1 in which the seed particles are finer than 325 mesh.

5. The process of claim 1 in which the seeded alkali metal silicate liquor is atomized with a pressure nozzle or an atomizer wheel.

6. The process of claim 1 in which the air flowing up the prilling tower has a velocity between 25 and 500 ft/min.

7. The process of claim 1 in which the air flowing up the prilling tower is humidified.

* * * * *

PO-1050
(5/69)

UNITED STATES PATENT OFFICE
CERTIFICATE OF CORRECTION

Patent No. 3,840,348      Dated October 8, 1974

Inventor(s) ERIC W. VESSEY

It is certified that error appears in the above-identified patent and that said Letters Patent are hereby corrected as shown below:

IN THE PRINTED COPY OF THE PATENT:

On the Cover page of the Official U. S. Patent, the title "CRYSTALLIZING ALKALI METAL CONTACT WITH SILICATE DROPLETS IN COUNTERCURRENT AIR FLOW", should read --CRYSTALLIZING ALKALI METAL SILICATE DROPLETS IN CONTACT WITH COUNTERCURRENT AIR FLOW--.

Signed and sealed this 10th day of December 1974.

(SEAL)
Attest:

McCOY M. GIBSON JR.      C. MARSHALL DANN
Attesting Officer      Commissioner of Patents